United States Patent [19]
Beecroft

[11] Patent Number: 5,406,431
[45] Date of Patent: Apr. 11, 1995

[54] FILTER SYSTEM FOR TYPE II HDD

[75] Inventor: Harold Beecroft, Colorado Springs, Colo.

[73] Assignee: Maxtor Corporation, San Jose, Calif.

[21] Appl. No.: 144,811

[22] Filed: Oct. 27, 1993

[51] Int. Cl.⁶ .............................................. G11B 17/02
[52] U.S. Cl. .................................................. 360/97.02
[58] Field of Search ................ 360/97.02, 97.03, 97.04

[56] References Cited

U.S. PATENT DOCUMENTS

| | | | |
|---|---|---|---|
| 4,369,475 | 1/1983 | Ho et al. | 360/97.02 |
| 4,594,626 | 6/1986 | Frangesh | 360/97.02 |
| 4,642,715 | 2/1987 | Ende | 360/97.02 |
| 4,725,904 | 2/1988 | Dalziel | 360/97.02 |
| 4,857,087 | 8/1989 | Bolton et al. | 360/97.02 |
| 4,863,499 | 9/1989 | Osendorf | 360/97.02 |
| 4,885,652 | 12/1989 | Leonard et al. | 360/97.02 |
| 5,030,260 | 7/1991 | Beck et al. | 360/97.03 |

Primary Examiner—Robert S. Tupper
Attorney, Agent, or Firm—Blakely, Sokoloff, Taylor & Zafman

[57] ABSTRACT

A filter system for a hard disk drive that complies with the PCMCIA specifications. The disk drive includes a cover that is coupled to a base plate by a spring clamp. The cover and base plate encapsulate a disk and accompanying actuator arm assembly in an area referred to as the HDA. Located between the HDA and the spring clamp is a carbon filled breather filter which removes contaminants such as particles and acidic gases from air that flows through the cover and base plate interface. The disk drive also has a pair of recirculation filters which capture any particles or acidic gases within the HDA.

5 Claims, 2 Drawing Sheets

FILTER SYSTEM FOR TYPE II HDD

BACKGROUND OF THE INVENTION

1. Field of the Invention

The present invention relates to a filter system for a hard disk drive.

2. Description of Related Art

Hard disk drives contain magnetic heads which magnetize and sense the magnetic fields of adjacent magnetic disks. The introduction of contaminants such as dust or water into the drive unit may induce errors during the operation of the disk drive. It would be desirable to absolutely seal the disk drive to prevent foreign matter from entering the inner cavity of the drive. Unfortunately, defects occur in the manufacturing or subsequent use of the disk drive which degrade the seal. For this reason most commercially available hard disk drives contain filter systems that remove contaminants that enter the drive unit. Such filter systems typically have a dedicated opening or openings through which ambient air may flow into the disk drive. A filter(s) is typically placed in fluid communication with the opening to capture any contaminants. The opening typically requires an additional manufacturing step which increases the cost of the drive. It would be desirable to have a disk drive which can "breath" without having any openings in the drive.

A filter system for a hard disk drive must be capable of removing both dust and water particles that may enter the drive unit. Additionally, it is also desirable to have a second filter system that removes any contaminants that were not captured by the primary filters, trapped in the drive during assembly, or that enter the cavity through a secondary opening. These contaminants may include acidic gases that are released by components located within the drive. It would be desirable to have a filter system within the disk drive which can remove different types of contaminants within the drive. It would also be desirable to have a multi-function filter system that can fit within a hard disk drive which meets the specifications promulgated by the Personal Computer Memory Card International Association (PCMCIA).

SUMMARY OF THE INVENTION

The present invention is a filter system for a hard disk drive that complies with the PCMCIA specifications. The disk drive includes a cover that is coupled to a base plate by a spring clamp. The cover and base plate encapsulate a disk and accompanying actuator arm assembly in an area referred to as the HDA. Located between the HDA and the spring clamp is a carbon breather filter which removes contaminants that flow from the ambient toward the HDA of the drive. The breather filter is located within a breather cavity which is in fluid communication with the HDA. The breather cavity provides a relatively low fluid resistance path to the HDA, so that any fluid movement through the interface of the cover and base plate will flow through the cavity, where the filter can capture any contaminants.

Located within the HDA is a first recirculation filter which captures any contaminants within the disk area. The disk drive also contains a carbon filled recirculation filter located within the HDA. The second filter absorbs both water and any acidic gases that may exist within the drive. Rotation of the disk creates an internal air flow which forces the air within the drive across the recirculation filters, so that the filters can remove the contaminants.

It is therefore an object of the present invention to provide a filter system for a hard disk drive that removes contaminants that attempt to enter the disk drive, contaminants within the disk drive, and acidic gases that may be released within the drive.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
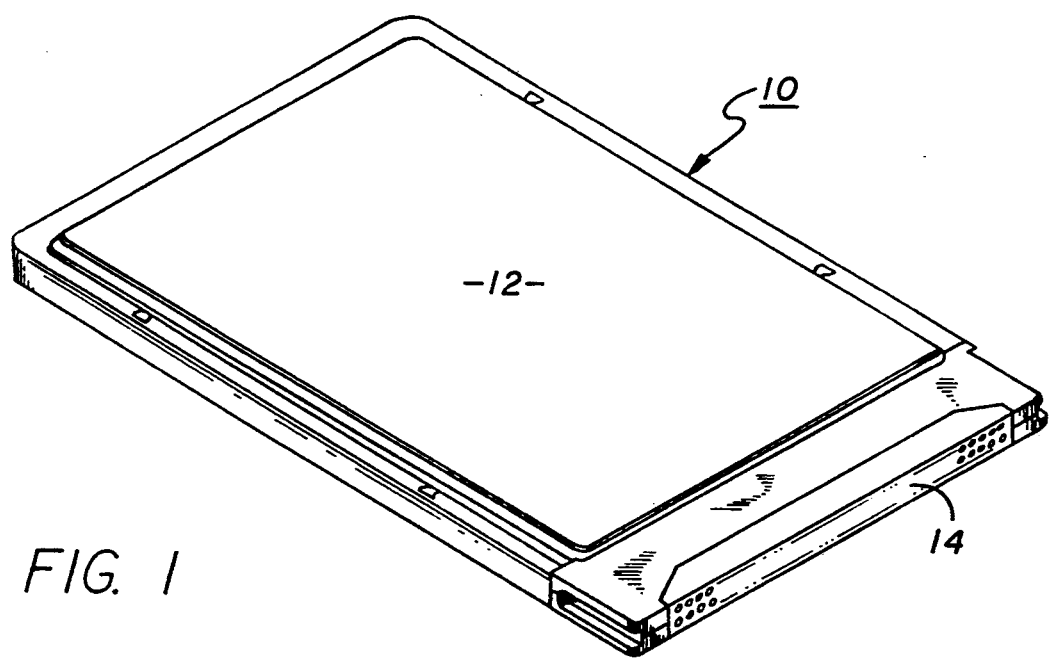
FIG. 1 is a perspective view of a hard disk drive of the present invention.

Referring to the drawings more particularly by reference numbers, FIG. 1 shows a hard disk drive card assembly 10 that can be plugged into a computer (not shown). The assembly 10 includes a housing 12 and a connector 14. In the preferred embodiment, the housing has the dimensions of 85.6×54.0×5.0 millimeters. The dimensions conform with the specifications issued by the Personal Computer Memory Card International Association (PCMCIA) for a type II electronic card. The PCMCIA is an association that has promulgated a specification which list dimensions and other requirements for a standard electronic card. Each computer that conforms with the PCMCIA specification will contain slots that can receive a standardized card. With such a standard, electronic cards of one computer can be readily plugged into another computer, regardless of the model or make of the computers.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a motherboard to provide an interconnect to the computer system. The connector 14 of the card assembly 10 has 68 pins that correspond to the pins of the host connector, so that the card can be plugged into the computer. Although a type II card has been described as the preferred embodiment, it is to be understood that the present invention can be used in any disk drive, including PCMCIA type I or type III formats.

Figure 2:
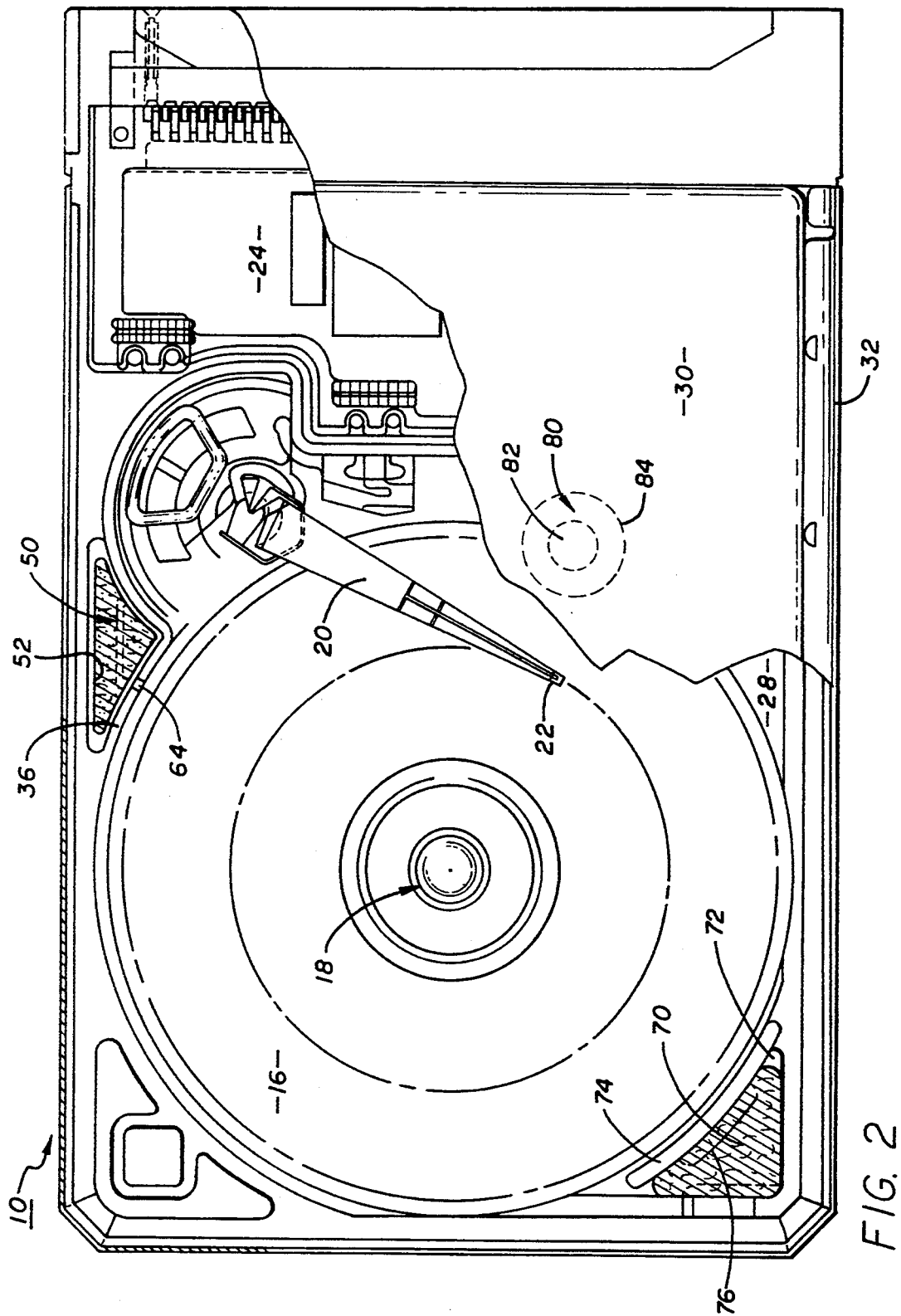
FIG. 2 is a top cross-sectional view of the disk drive.

As shown in FIG. 2, the card unit 10 contains a magnetic disk 16 which is rotated by a spin motor 18. The magnetic disk 16 rotates relative to an actuator arm assembly 20 which contains a head(s) 22 that can magnetize and sense the magnetic field of the disk 16. The actuator arm assembly 20 and spin motor 18 are coupled to a printed circuit board 24 located at one end of the card assembly 10. The printed circuit board 24 supports a plurality of electrical components 26 that control the operation of the disk drive.

As shown in FIG. 1, the spin motor 18, actuator arm assembly 20 and printed circuit board 24 are mounted to a base plate 28 and enclosed by the cover plate 30. The cover plate 30 is coupled to the base plate 28 by a clamp 32.

Figure 3:
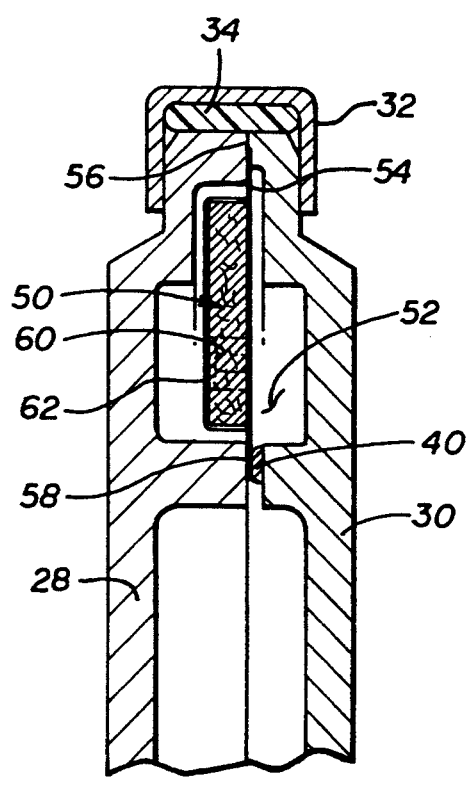
FIG. 3 is a cross-sectional view of a breather filter of the disk drive.

As shown in FIG. 3, located between the plates 28 and 30 is an elastomeric shock strip 34. The disk drive 10 has a wall 36 which defines an area commonly referred to as the HDA 38. The cover 30 presses a seal 40 into contact with the wall 36 to seal the disk 16 and actuator arm assembly 20 within the HDA 38.

As shown in FIGS. 2 and 3, the disk drive 10 includes a breather filter 50 located within a breather cavity 52. The breather filter 50 has an outer rim 54 which is captured by the plate interface 56 and the seal/wall interface 58. The breather filter 50 removes impurities from air that may flow through the plate interface 56 and into the cavity 52. In the preferred embodiment, the breather filter 50 has a carbon bed 60 that is encapsulated by an outer filter layer 62. The carbon bed 60 is constructed to absorb acidic and hydrocarbon gases. The outer layer 62 is constructed to removed particles. In the preferred embodiment, the outer layer 62 is constructed from a coated polyester commonly sold by W. L. Gore & Assoc. Inc. under the trademark GORE-TEX.

Fluid communication is provided between the breather cavity 52 and the HDA 38 through a slot 64 in the wall 36. The breather cavity 52 and slot 64 provide a relatively low fluid resistance path for air to flow from the ambient to the HDA 38. In operation, when the disk drive is exposed to a condition that creates a differential pressure between the ambient and the HDA 38, the differential pressure induces an airflow across the plate interface 56, through the breather cavity 52 and into the HDA 38. The breather filter 50 removes any impurities and acidic gases in the air. As an alternate embodiment, the breather filter 50 may also contain a desiccant to remove any water in the air.

Figure 4:
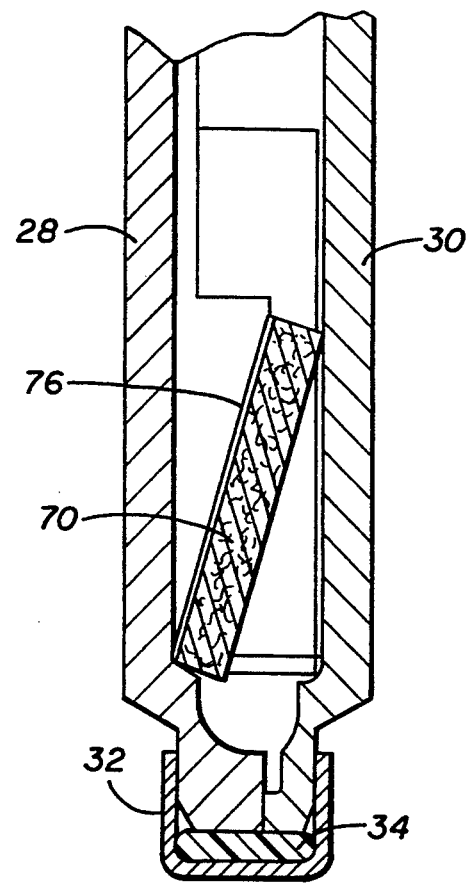
FIG. 4 is a cross-sectional view of a recirculation filter of the disk drive.

The disk drive 10 also includes a recirculation filter 70 located in a recirculation cavity 72. The recirculation cavity 72 is defined by a wall 74 within the HDA 38. The wall 74 has a ledge 76 which supports the filter 70. As shown in FIG. 4, the recirculation filter 70 is oriented at an angle to increase the surface area of the filter 70. In the preferred embodiment, the recirculation filter 70 is constructed from GORE-TEX and removes impurities that exist or flow into the HDA 38. Rotation of the disk 16 induces an internal airflow which forces air across the recirculation filter 70, wherein any particles are removed by the filter 70.

As shown in FIG. 2, the disk drive may also contain a second recirculation filter 80 attached to the cover 30 and located within the HDA 38. In the preferred embodiment, the second filter 80 has a carbon bed 82 encapsulated by an outer layer 84 of GORE-TEX. The internal air flow created by the rotating disk allows the second recirculation filter 80 to further remove particles, and acidic and hydrocarbon gases that are within the HDA 38.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A filter system for a hard disk drive, comprising:
   a cover plate that has an outer wall that at least partially defines a disk assembly cavity, a breather filter cavity and a recirculation filter cavity located within said disk assembly cavity;
   a base plate that has an outer wall that also partially defines said disk assembly cavity, said breather filter cavity and said recirculation filter cavity located within said disk assembly cavity, said outer wall having a passage that allows fluid communication between said breather filter cavity and said disk assembly cavity, said outer wall of said base plate and said outer wall of said cover defining an interface that is in fluid communication with the outside ambient through said breather filter cavity;
   a disk located within said disk assembly cavity;
   rotation means for rotating said disk;
   an actuator arm assembly operatively connected to said disk;
   a breather filter located within said breather filter cavity; and,
   a first recirculation filter located within said recirculation filter cavity.

2. The filter system as recited in claim 1, further comprising a second recirculation filter located within said disk assembly area and which contains a carbon bed.

3. The filter system as recited in claim 1, wherein said base plate has a separating wall that separates said recirculation filter cavity from said hard disk assembly chamber.

4. The filter system as recited in claim 1, wherein said breather filter has a carbon bed.

5. A filter system for a hard disk drive, comprising:
   a cover plate that has an outer wall that at least partially defines a disk assembly cavity, a breather filter cavity and a recirculation filter cavity;
   a base plate that has an outer wall that also defines said disk assembly cavity, said breather filter cavity and said recirculation filter cavity, said base plate having a separating wall that separates said recirculation filter cavity from said disk assembly cavity and a passage that allows fluid communication between said disk assembly cavity and said breather filter cavity;
   a disk located within said disk assembly cavity, said outer wall of said base plate and said outer wall of said cover defining an interface that is in fluid communication with the outside ambient through said breather filter cavity;
   rotation means for rotating said disk;
   an actuator arm assembly operatively connected to said disk;
   a breather filter located within said breather filter cavity, said breather filter containing a carbon bed;
   a first recirculation filter located within said recirculation filter cavity; and,
   a second recirculation filter located within said disk assembly cavity, said second recirculation filter having a carbon bed.

* * * * *